(12) United States Patent
Skinner et al.

(10) Patent No.: US 6,447,146 B1
(45) Date of Patent: Sep. 10, 2002

(54) CONTROLLING TEMPERATURES IN A BACK LIGHT OF A FLAT-PANEL DISPLAY

(75) Inventors: Dean W. Skinner, Vestal, NY (US); Lawrence T. Guzowski, Newington, CT (US)

(73) Assignees: Rainbow Displays, Inc., Endicott, NY (US); Performance Display Systems, Inc., Newington, CT (US)

( * ) Notice: Subject to any disclaimer, the term of this patent is extended or adjusted under 35 U.S.C. 154(b) by 0 days.

(21) Appl. No.: 09/407,619

(22) Filed: Sep. 28, 1999

(51) Int. Cl.[7] ............................................... F21V 29/00
(52) U.S. Cl. ........................ 362/294; 362/218; 362/276; 362/373
(58) Field of Search ........................ 362/96, 218, 294, 362/373, 276, 30, 29, 251, 802

(56) References Cited

U.S. PATENT DOCUMENTS 4,691,267 A * 9/1987 Giesberg .................... 362/373
5,565,903 A * 10/1996 Ueda ......................... 362/294
5,661,531 A    8/1997 Greene et al.
5,903,328 A    5/1999 Greene et al.
5,993,027 A * 11/1999 Yamamoto et al. ......... 362/218

* cited by examiner

Primary Examiner—Y. My Quach-Lee
(74) Attorney, Agent, or Firm—Salzman & Levy

(57) ABSTRACT

The present invention features apparatus and a method for controlling luminance emitted from a back light module for a large, tiled, flat-panel, liquid crystal display (LCD). A mechanism is provided for achieving luminance stability of fluorescent lamps, high efficiency and long life through controlling and maintaining lamp tube wall temperatures. Air flow variations are controlled by a microprocessor and a network of electric fans. The lamps may also be dimmed selectively to obtain optimum lamp tube wall temperatures. There is also provided a mechanism for safely preventing overheating of the back light and display due to high ambient temperatures or component failures. Further, the controls can be used in conjunction with ambient light sensing or manual controls to maintain appropriate output light intensity.

27 Claims, 10 Drawing Sheets

Back Light Schematic

CONTROLLING TEMPERATURES IN A BACK LIGHT OF A FLAT-PANEL DISPLAY

FIELD OF THE INVENTION

This invention pertains to large tiled, flat-panel displays and, more particularly, to an apparatus for controlling the temperature and thereby maintaining a bright, uniform illumination in a back light system for large, tiled, flat panel displays with intense lighting capability in the range of 50,000 to 150,000 nits.

BACKGROUND OF THE INVENTION

Large flat-panel displays made in accordance with known active matrix (or TFT) liquid crystal display technologies are typically mounted in front of a back light module which contains an array of fluorescent lamps. FPDs of this type have been increasing in size by about 1 to 2 inches diagonal yearly. The median size in 1999 for use in desk top PCs is about 15 inches diagonal view area. A few very large displays are made in the range of 20 to 25 inches diagonal. Tiled AMLCD FPDs may be made in the range of 40 inches diagonal, as described in copending U.S. patent application Ser. No. 09/368,921, assigned to the common assignee and hereby included as reference. However, tiling, as described in U.S. Pat. No. 5,661,531 and also included as reference requires extremely intense light sources with substantially collimated lighting, masked optical stacks, and pixel apertures that have very low emitted light efficiency. Thus, lighting with unusually high intensity ranges of 50,000 to 150,000 nits (candellas/square meter) is desirable with uniformity over very large FPD areas. Unique designs, and control features are necessary to achieve such high intensities at reasonable wattages for consumer or business applications.

Maintaining a bright and uniform illumination of the display over its entire active area is very difficult to do. The intensity required for some applications, in particular that required for a large, tiled, flat-panel LCD display as described in U.S. Pat. Nos. 5,661,531, entitled CONSTRUCTION AND SEALING OF TILED, FLAT-PANEL DISPLAYS, and 5,867,236, entitled CONSTRUCTION AND SEALING OF TILES, FLAT-PANEL DISPLAYS, causes the lamps to produce a significant amount of heat in order to meet predetermined brightness specifications. In addition, fluorescent lamps are designed to run most efficiently at predetermined elevated temperature. It is desirable to run them at their ideal design temperature, which is usually between approximately 50 and 60 degrees Centigrade.

Small edge lit back light modules used in notebook or laptop PCs do not produce sufficient brightness for a large area display, nor are they capable of illuminating a large area uniformly. Thus, it is preferable to illuminate the area with an array of fluorescent lamps. The optimum number of lamps required depends on the size of the area to be illuminated and the display brightness specifications preferably in the range of 300 nits to the viewer as described in co-pending patent applications, Ser. Nos. 09/406,977 and 09/407,620 filed concurrently herewith and hereby incorporated by reference. A large area display requires multiple lamps to illuminate it to the desired level properly.

Since most displays are designed to be wider than they are tall, it is advantageous from a reliability and power perspective to use horizontal lamps. This results in fewer lamps and less power, since there are fewer lamp cathodes. The resultant designs have lamp tubes placed horizontally, one above the other. This produces a chimney effect, where the upper lamps receive heated air from the lamps below. The temperature differential from top to bottom can become severe. The lamp tube temperature differences can cause significant variations in the luminance of the back light as well as decreased life expectancy.

This invention provides unique means for controlling the temperatures to be substantially the same for all lamp tubes and allows for maintaining a desired predetermined level of maximum brightness by keeping all of the lamp tubes at or very near optimum temperature. This then provides for uniform brightness at peak efficiencies and the longest possible lamp life. The controls for the back light keep the lamps individually or in groups at the optimum temperature, regardless of the ambient temperature. One component of the control is provided through the combined use of variable speed cooling fans, temperature sensors, and control logic.

This invention further provides a second unique means of predetermined accurate control by the addition of dimming ballasts that can be used in the previously mentioned combined control system to very accurately control the temperature profile in the hierarchy of lamps and add the capability for safety operation (controlled shut down) in the event of gross overheating. With the individual control over lamp input power, each lamp can be dimmed such that it stays at the optimum temperature. This can be done by characterizing the temperature distribution in the back light, or by providing individual sensors on each lamp.

Additionally, the dimming ballasts along with the control logic can be used for keeping the lamps off until the display system is activated. The dimming feature is also used for manual brightness control or ambient light sensing control.

SUMMARY OF THE INVENTION

The present invention pertains to back light systems for tiled, flat-panel displays which require unusually high levels of illumination in the range of 50,000 to 150,000 nits. The invention reflects the useful discovery that a substantially constant and uniform luminance output of the back light module is readily obtained if the lamp tube wall temperature is kept substantially constant. This invention provides unique means for achieving this through control of the lamp temperature using a combination of air flow variations and lamp dimming means. Further, the controls can be used in conjunction with ambient light sensing or manual controls to maintain predetermined output light intensity. In addition, the back light module controls can be used to avoid overheating and loss of the display due to such overheating. Another benefit of the control system is enhanced life expectancy, due to minimizing overheating and providing a lower time-averaged lamp temperature.

Methods are disclosed herein for controlling luminance emitted from a back light module for a flat-panel, liquid crystal display (LCD). Fluorescent lamps are commonly used in back light modules for LCDs, due to their high efficiency. Luminance from fluorescent lamps is a function of lamp tube temperature, as is the efficiency and also lamp life. This invention provides means for achieving luminance stability, high efficiency and long life through controlling and maintaining lamp tube wall temperatures. In another embodiment of this invention, means are disclosed to selectively dim the lamps to obtain optimum lamp tube temperatures. Actual practice of this invention has resulted in luminance output over a large area (½ square meter) exceeding 50,000 nits and ability to hold this luminance level within 2 percent over days of continuous operation.

In accordance with the present invention, there is also provided means for safely preventing overheating of the back light and display due to high ambient temperatures or component failures.

BRIEF DESCRIPTION OF THE DRAWINGS

A complete understanding of the present invention may be obtained by reference to the accompanying drawings, when considered in conjunction with the subsequent, detailed description, in which.

For purposes of both clarity and brevity, like elements and components will bear the same designations and numbering throughout the figures.

DESCRIPTION OF THE PREFERRED EMBODIMENT

Generally speaking, the invention features apparatus and a method for controlling the luminance of a large area back light for a flat-panel display that requires high luminance levels. In addition, the invention features apparatus and a method for controlling the back light for optimized efficiency, lamp life and safe operation.

Figure 1:
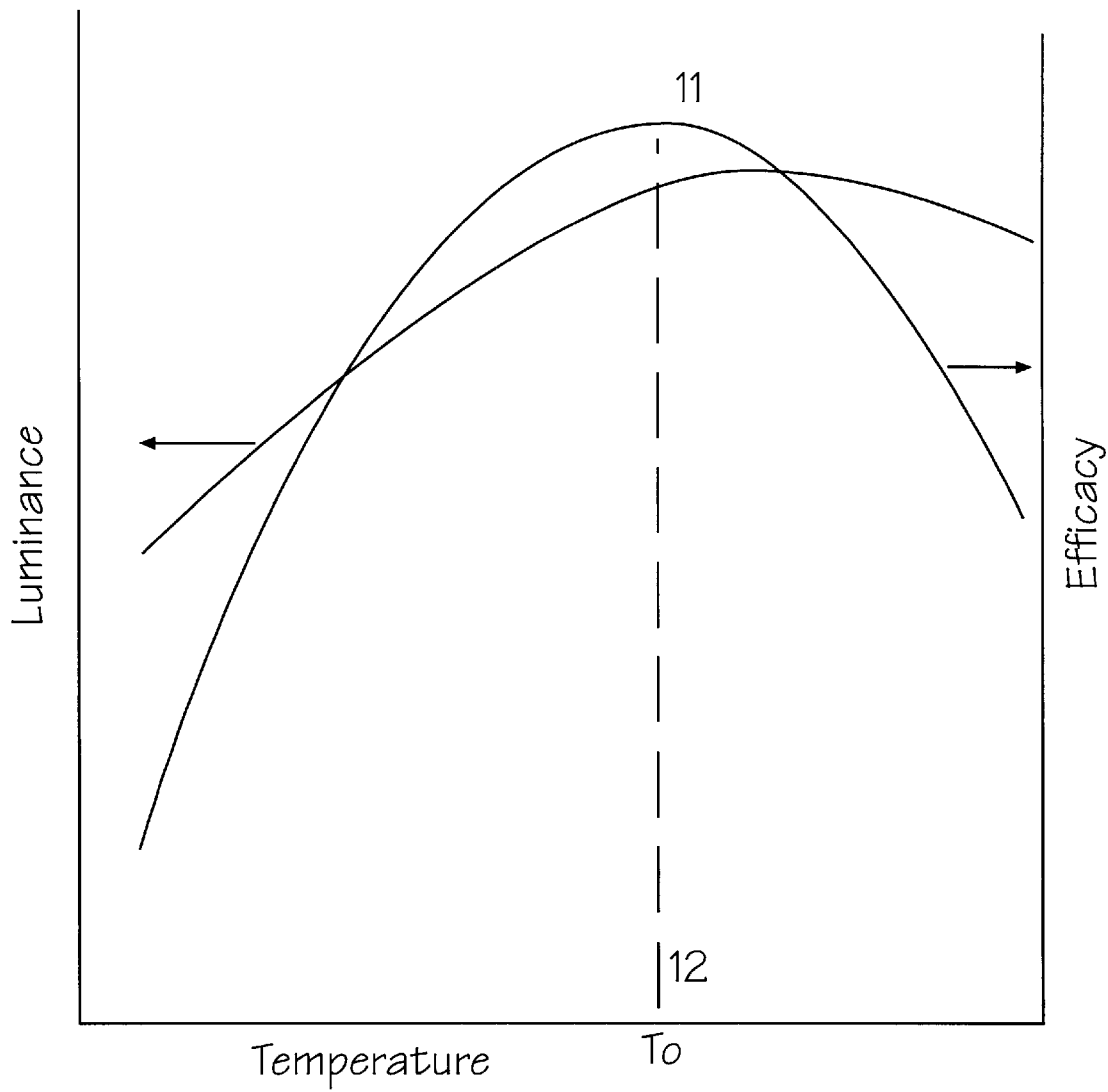
FIG. 1 graphically illustrates the temperature characteristics of a fluorescent lamp.

Now referring to FIG. 1, there is shown a graph of the temperature characteristics of a fluorescent lamp. A typical fluorescent lamp, not shown, is designed to operate most efficiently at a predetermined lamp tube wall temperature. Maximum brightness occurs near the point of maximum efficiency 11. The ideal temperature then is said to be $T_0$ 12. The ideal temperature is determined by the lamp construction and its parameters (e.g., phosphors, mercury vapor pressure, etc.). The most efficient lamps are those referred to as "hot cathode" lamps. These lamps have a preheat cycle during which the cathodes are heated, thereby allowing easier ignition of the gas.

Figure 2A:
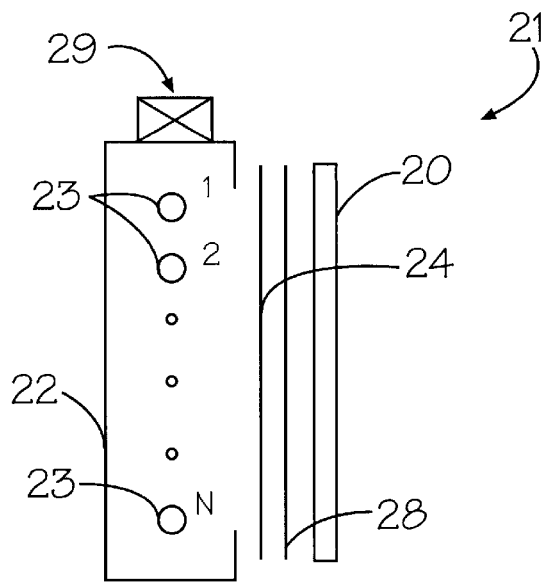
FIG. 2a is a side, cross sectional view of a multiple lamp back light and a display in accordance with the present invention.

Now referring to FIG. 2a, a side, cross sectional view of a flat-panel display 20 and its back light assembly 21 is shown. The back light assembly 21 comprises a light box cavity 22, an array of fluorescent lamps 23, and a light diffuser 24. Cooling fans 29 are attached to the cavity 22. Some display applications require additional optics 28 to enhance certain characteristics of the exiting light. An example is the previously mentioned tiled, flat-panel LCD display, which uses highly collimated light. The additional optics 28 required to perform this enhancement can be inefficient, and therefore necessitate that a high luminance be produced by the back light 21.

Figure 2B:
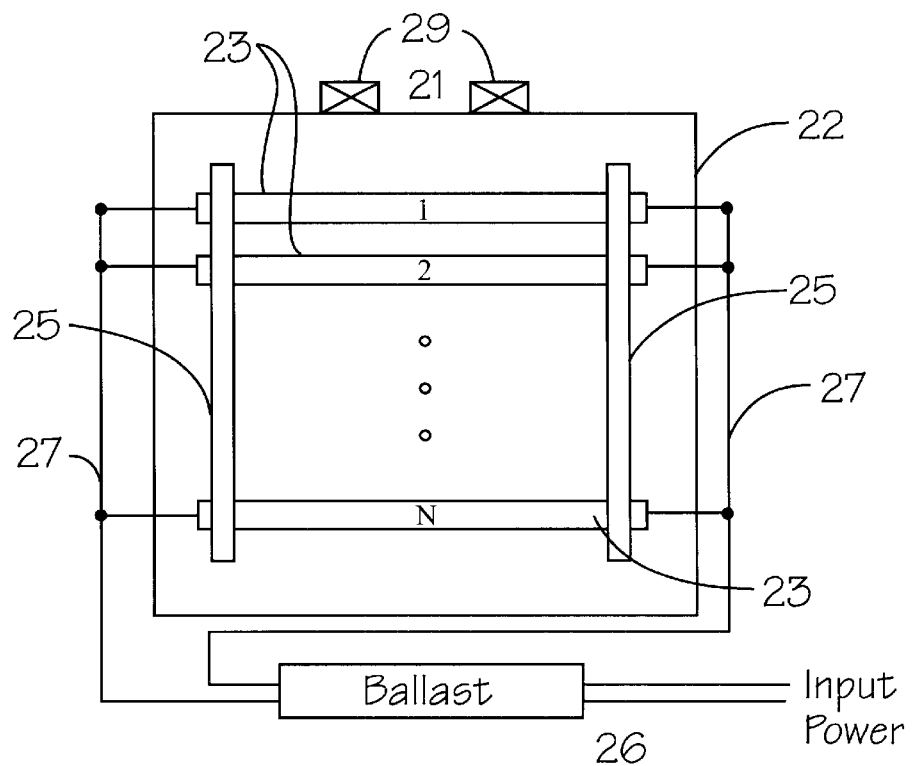
FIG. 2b illustrates a plan view of a multiple lamp back light.

FIG. 2b shows a front view of the back light assembly 21. The lamps 23 are held in the light box cavity 22 by lamp holders 25. The lamps 23 are wired to a ballast 26 by a wiring harness 27. The ballast 26 supplies high frequency (usually 20–30 KHz) AC power to the lamps 23.

Figure 3:
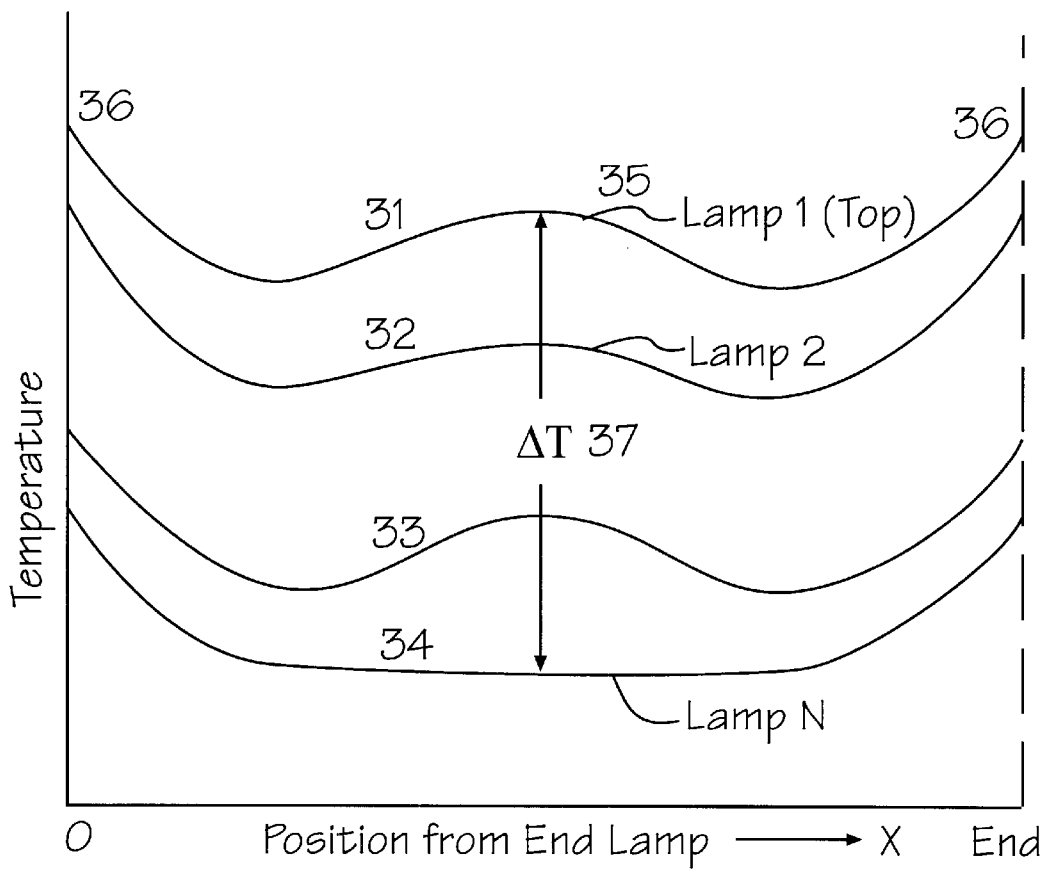
FIG. 3 graphically illustrates the lamp temperature in an uncontrolled back light assembly.

FIG. 3 is a graph showing typical thermal profiles of the lamps 23 in the back light module 21, when operated with only natural convection cooling means. The temperature of the lowest lamp 34 is the coolest, increasing successively for lamps 33, 32 and achieving the greatest increase in the topmost lamp 31. The cathode areas (or ends) 36 of the lamps 23 are at a higher temperature than are intermediate regions of the lamps 23, due to the power consumption of the respective cathodes 36.

Also shown is the effect of the thermal chimney on the temperature of the center of the lamps, depicted on the graph by reference numeral 35, as air passes over the lamps. Lamp 31 is heated not only by the power supplied it, but also by the rising warm air from all of the lamps 32, 33, 34 disposed below it. The resultant operating lamp temperature range 37 is quite large. The object of this invention is to provide means for reducing this temperature range 37 to near zero.

Figure 4A:
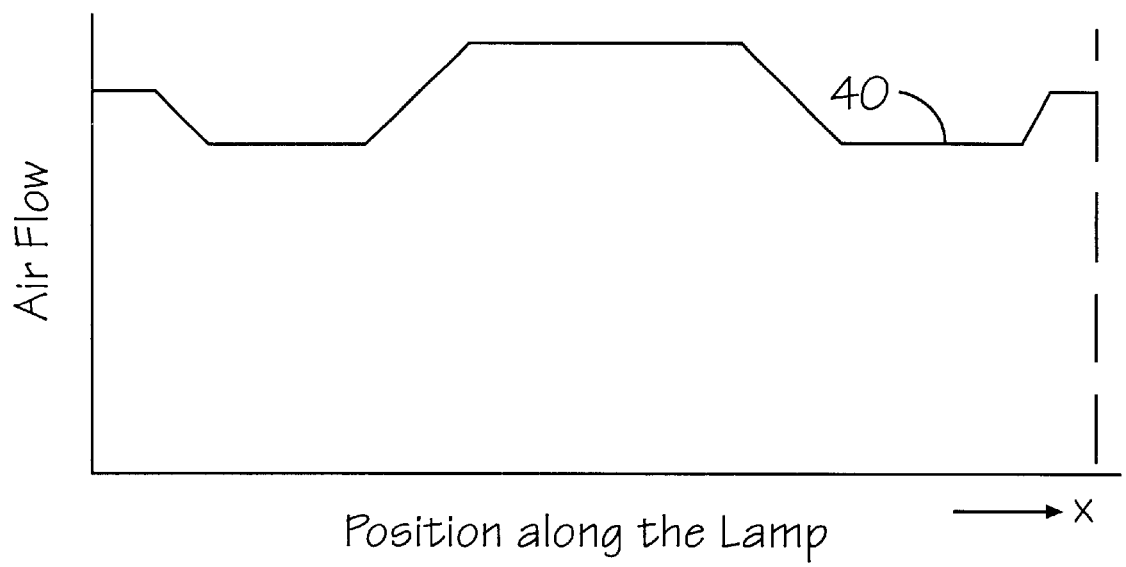
FIG. 4a graphically depicts the air flow needed to optimally cool a back light assembly.
Figure 4B:
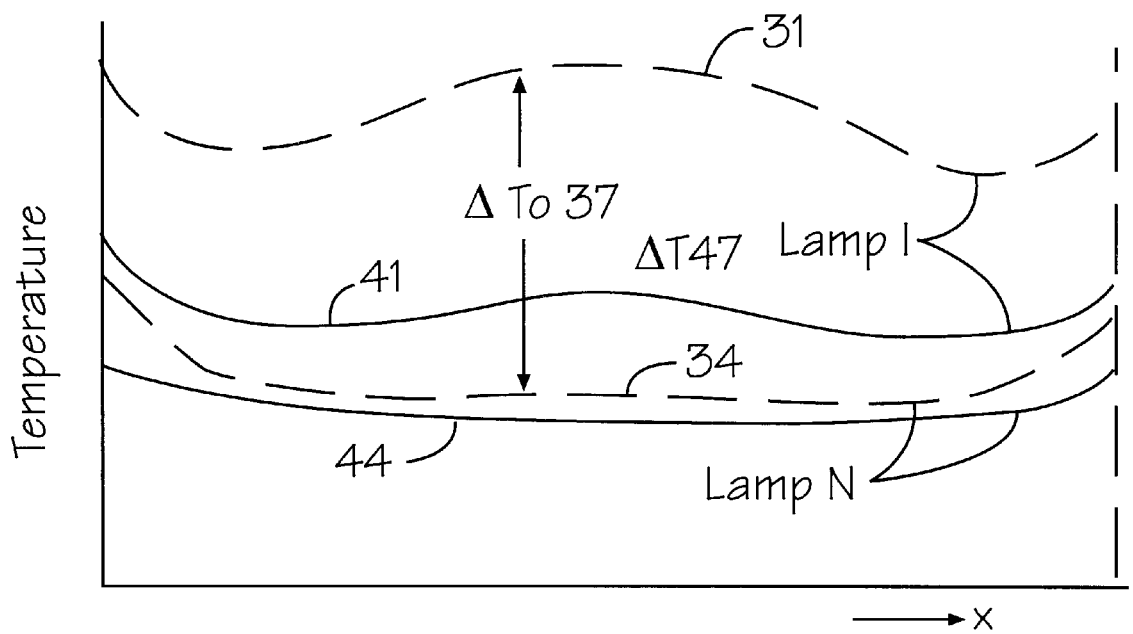
FIG. 4b graphically depicts air flow effect on lamp temperatures.

FIG. 4a depicts a graph of the air flow profile 40 required to attempt to keep the lamps 23 (FIG. 2a) at a more uniform temperature over the range of luminance values selected for operation. FIG. 4b depicts a graph of temperature profiles of the top and bottom lamps 23 before and after this air flow profile 40 is applied to the back light module 21. The upper lamp reaches a temperature profile referred to as reference numeral 31, without air flow; and referred to as reference numeral 41 with air flow. The lower lamp reaches a temperature profile shown as 34 without air flow; and referred to as reference numeral 44 with air flow. The resultant lamp operating temperature range in the back light module 21 reduces from the convection value 37 to the forced air value 47.

Figure 5:
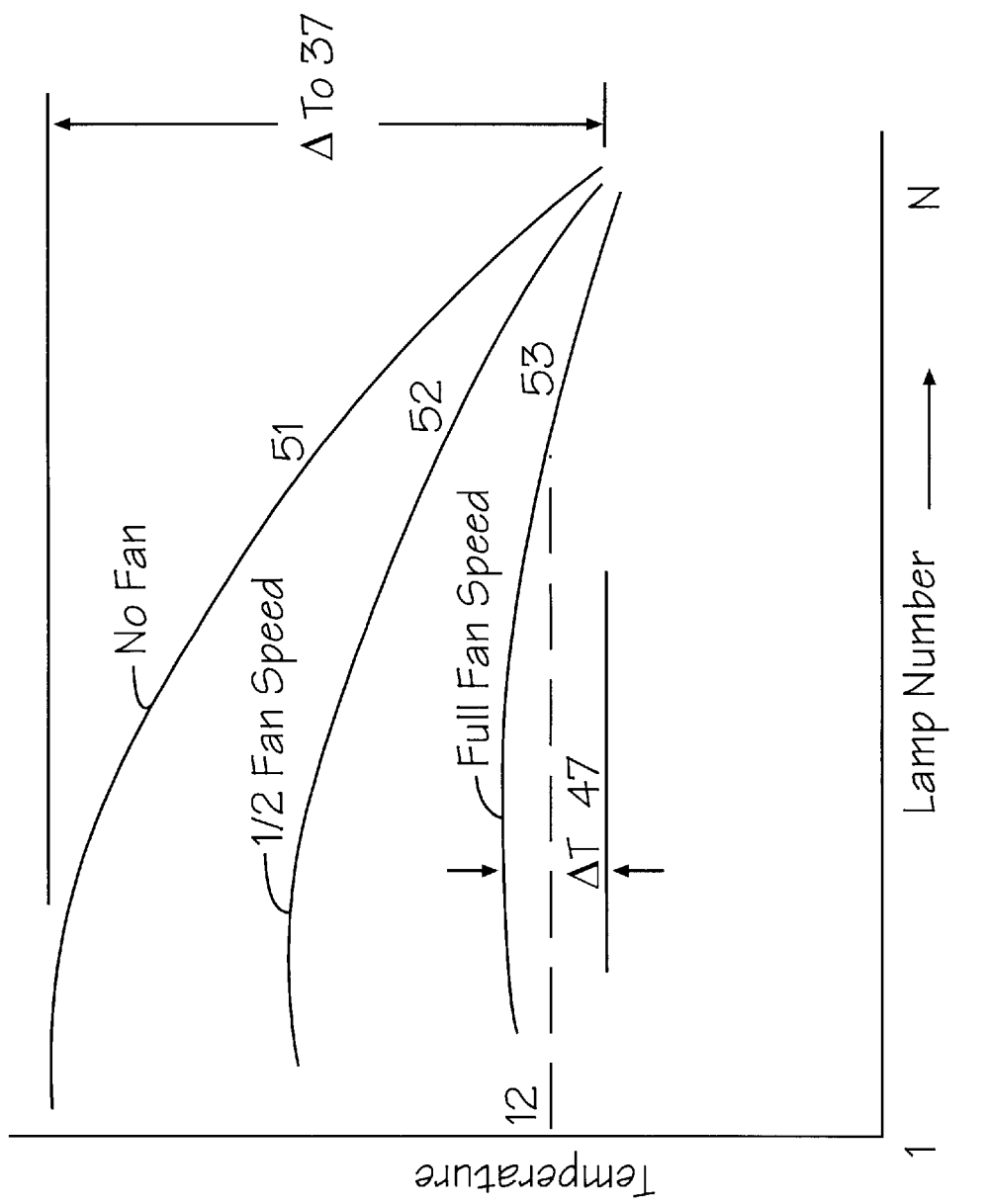
FIG. 5 graphically illustrates the temperature distribution across the back light.

Now referring to FIG. 5, a graphical depiction of the temperature of the central portion of each lamp tube 23 is shown for various fan speeds. When no air is driven through the back light module 21, the vertical temperature distribution is shown by curve 51, and has a large temperature range, $T_0$ 37. Curve 52 shows the temperature distribution with the fans at half speed. Curve 53 shows a minimum temperature range 47 and an average operating temperature near the ideal temperature 12.

Figure 6:
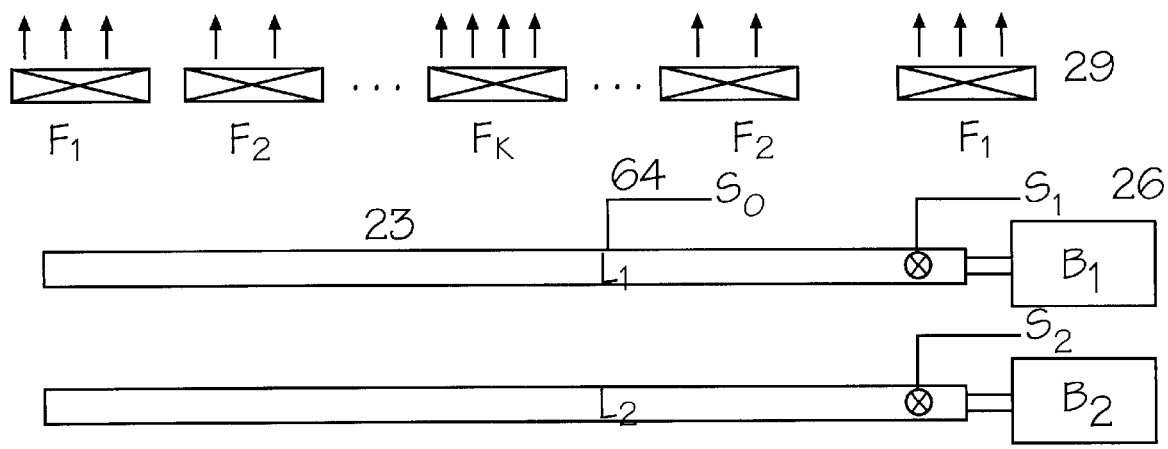
FIG. 6 schematically depicts a back light with multiple lamps, multiple fans, individual lamp temperature sensors and dimming ballasts, in accordance with the invention.

FIG. 6 schematically shows the relationship of the cooling fans 29, lamps 23, dimming ballasts 26, and temperature sensors 63 and 64, which are mounted in intimate contact with the lamps 23.

Figure 7:
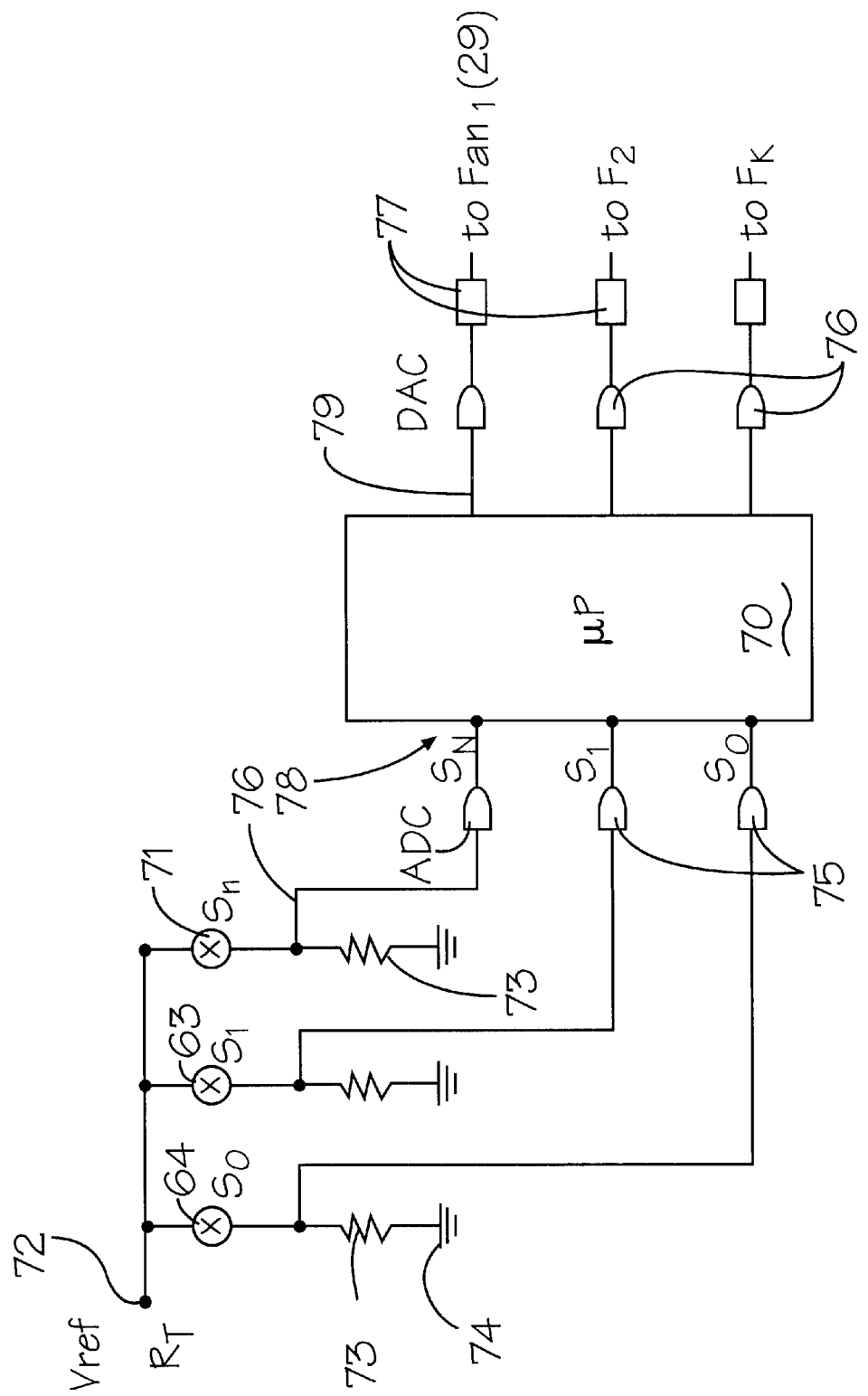
FIG. 7 is an electrical schematic diagram illustrating the fan speed control logic of the present invention.

FIG. 7 is an electrical schematic diagram that depicts a closed loop circuit for controlling fan speeds. One type of temperature sensor 71 in this embodiment is a thermistor forming part of a voltage divider network with fixed resistors 73 and held between a reference voltage 72 and ground 74. The divided voltage 76 is fed into a microprocessor 70 via analog-to-digital converters 75. This temperature sensor 71 in this embodiment can be used as sensors 63, 64.

A microprocessor 70 uses the digital temperature data 78 to adjust fan speeds. The digital output 79 of the microprocessor 70 is fed into the motor drive amplifiers 77 via digital-to-analog converters 76. In this embodiment, the motor drive amplifiers 77 then supply a DC voltage to the fans 29.

The simplest form of a control algorithm is to adjust all the speeds of the fans to be the same, based on the value of one sensor $S_1$. Air flow is uniform across the lamps 23. This is the most cost efficient control scheme. The adjustment to the microprocessor output 79 to changes in the input 78 is accomplished using a simple lookup table, not shown. The lookup table is empirically developed by actual test results. Notice that only one sensor and one motor drive amplifier is needed for this simplest of controls.

A two cooling zone air flow control system can be accomplished in two ways. The simplest is to thermally profile the unit during actual testing and determine the air speed ratios desired between the two cooling zones. A more complex method is to use two sensors 63 and 64, of the type 71 for example, to independently control the air flow (a) up through the center of the back light assembly 21 and (b) for the sides of the back light assembly 21. Additional sensors and motor drive amplifiers, not shown, can be added to attempt to control the temperature distribution more accurately within the back light assembly 21. It has been found that a dual cooling zone with one sensor is adequate for most applications.

Figure 8:
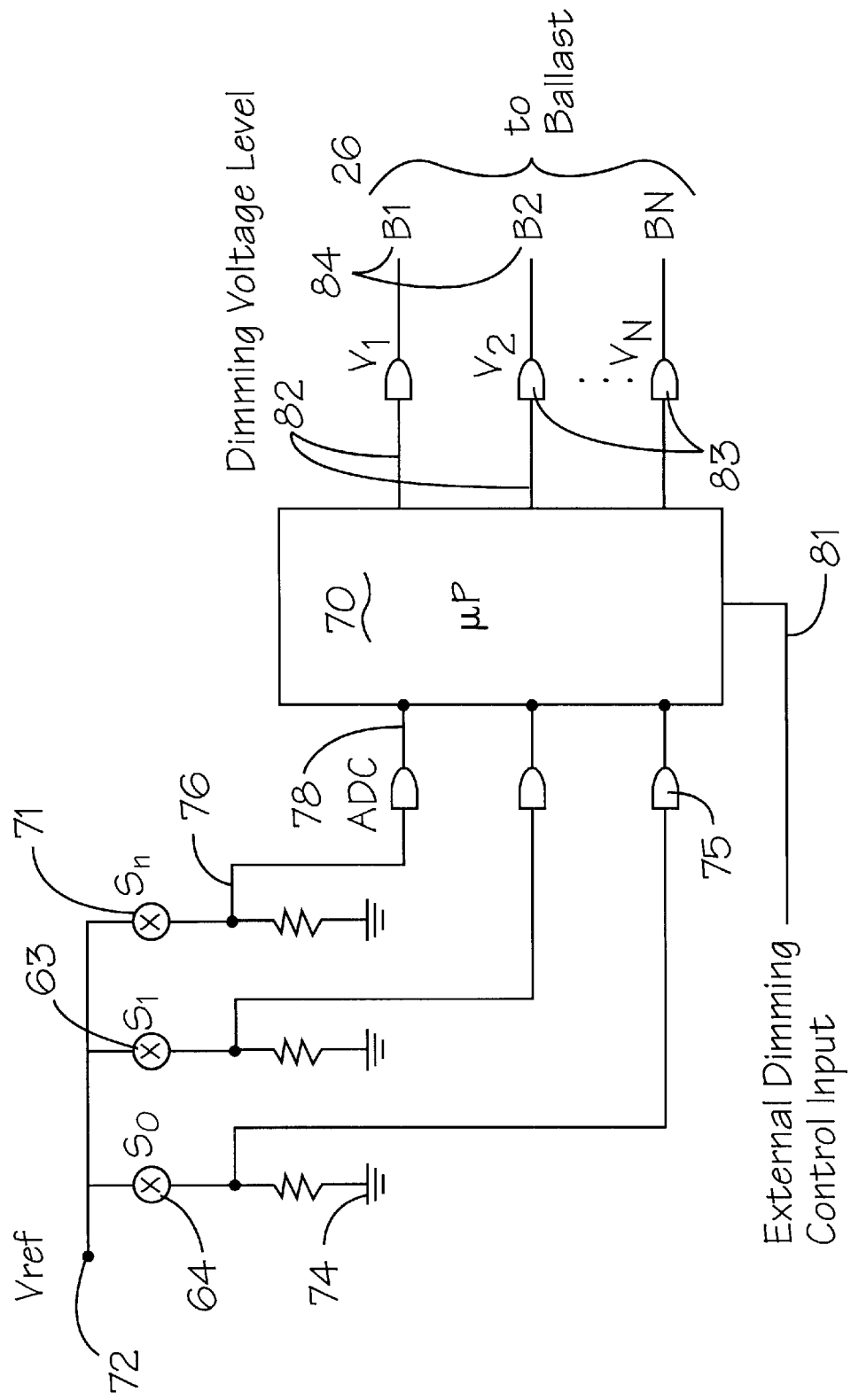
FIG. 8 is an electrical schematic diagram illustrating the dimming ballast control logic.

FIG. 8 shows the control system used for dimming the lamps individually or in groups. The control again is through lookup tables in the microprocessor 70. Lamp temperature digital data 78 is fed to the microprocessor 70, as previously shown. The ballasts 26 have a dimming feature such that the output of a ballast 26 is proportional to a DC input voltage 84. The digital output 82 of the microprocessor 70 is converted to the appropriate ballast voltage 84 via a digital-to-analog converter 83. Each lamp may be driven by one ballast 26 or the lamps 23 may be ganged so that one ballast 26 can drive several lamps In simplest form, the ballasts 26 are all given the same dimming voltage 84. The dimming voltage 84 is controlled by one sensor 71 (the same one used for fan control) and the external brightness command 81. Dimming voltage 82 and fan speed voltage 79 are determined from a lookup table, the inputs for which are temperature sensor data 78 and brightness setting 81.

Brightness increases based on input 81, as long as the average maximum temperature does not exceed the ideal 12. Brightness can be decreased by external input. Microprocessor output 82 to the ballasts is decreased accordingly. In addition, fan speed data 79 is lowered to a predetermined level based on a new lower ideal temperature that has been empirically determined by actual testing.

Figure 9:
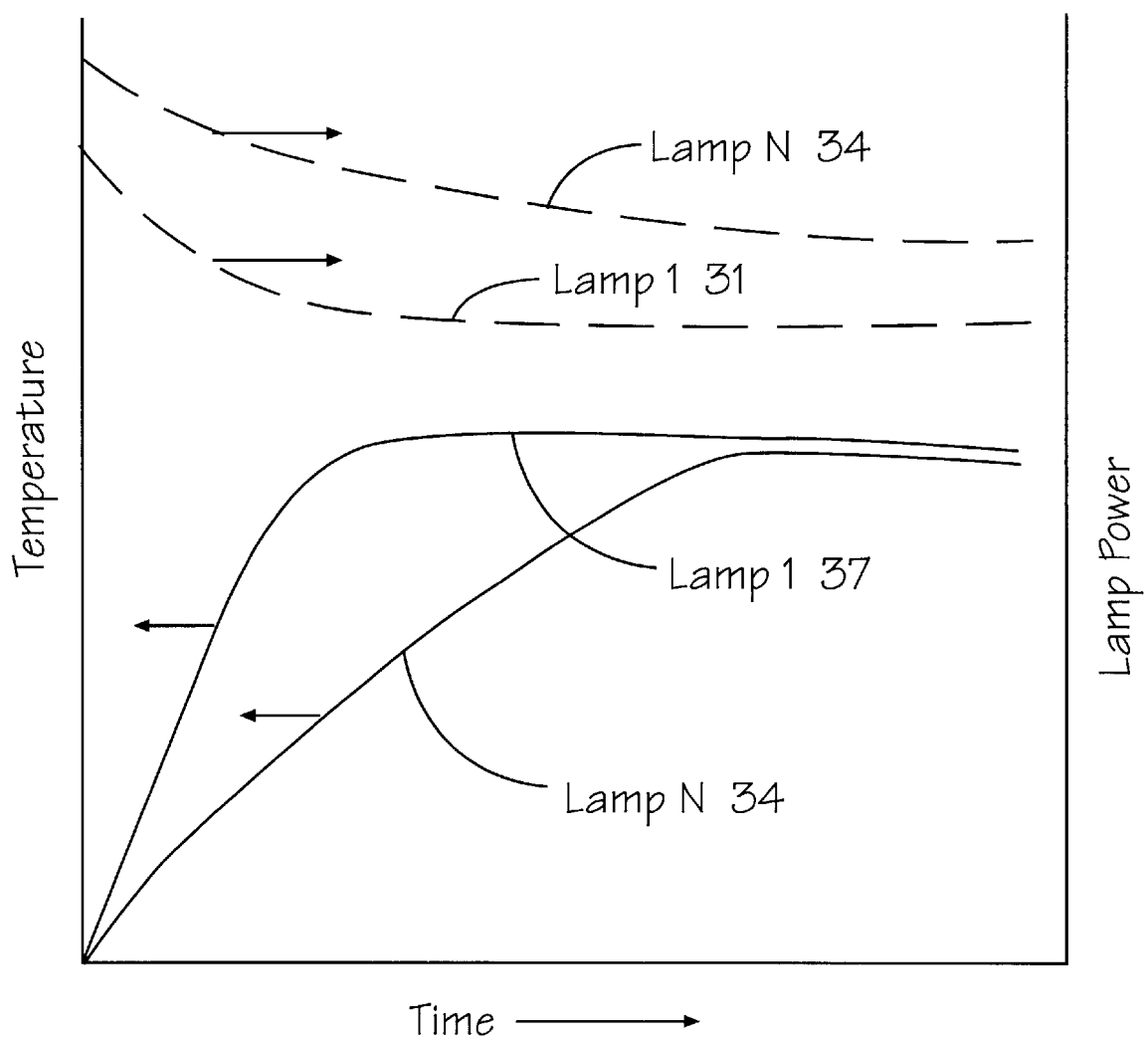
FIG. 9 graphically illustrates temperature control vs. resultant power consumption over time.

Referring now to FIG. 9, the most expensive and most controllable system includes a lamp temperature sensor 71 and a dimming ballast 26 for each lamp. The lamp temperature and lamp power for the upper 31 and lower 34 lamp are shown. The temperature range 47 can further be reduced by using the dimming feature of the ballasts 26. Temperature range can be brought to near zero with individual or multiple cooling zone lamp dimming capability. Input may be multiple lamp sensors 71 or by the use of a predetermined thermal profile imbedded in the dimming output lookup table in the microprocessor 70.

Figure 10:
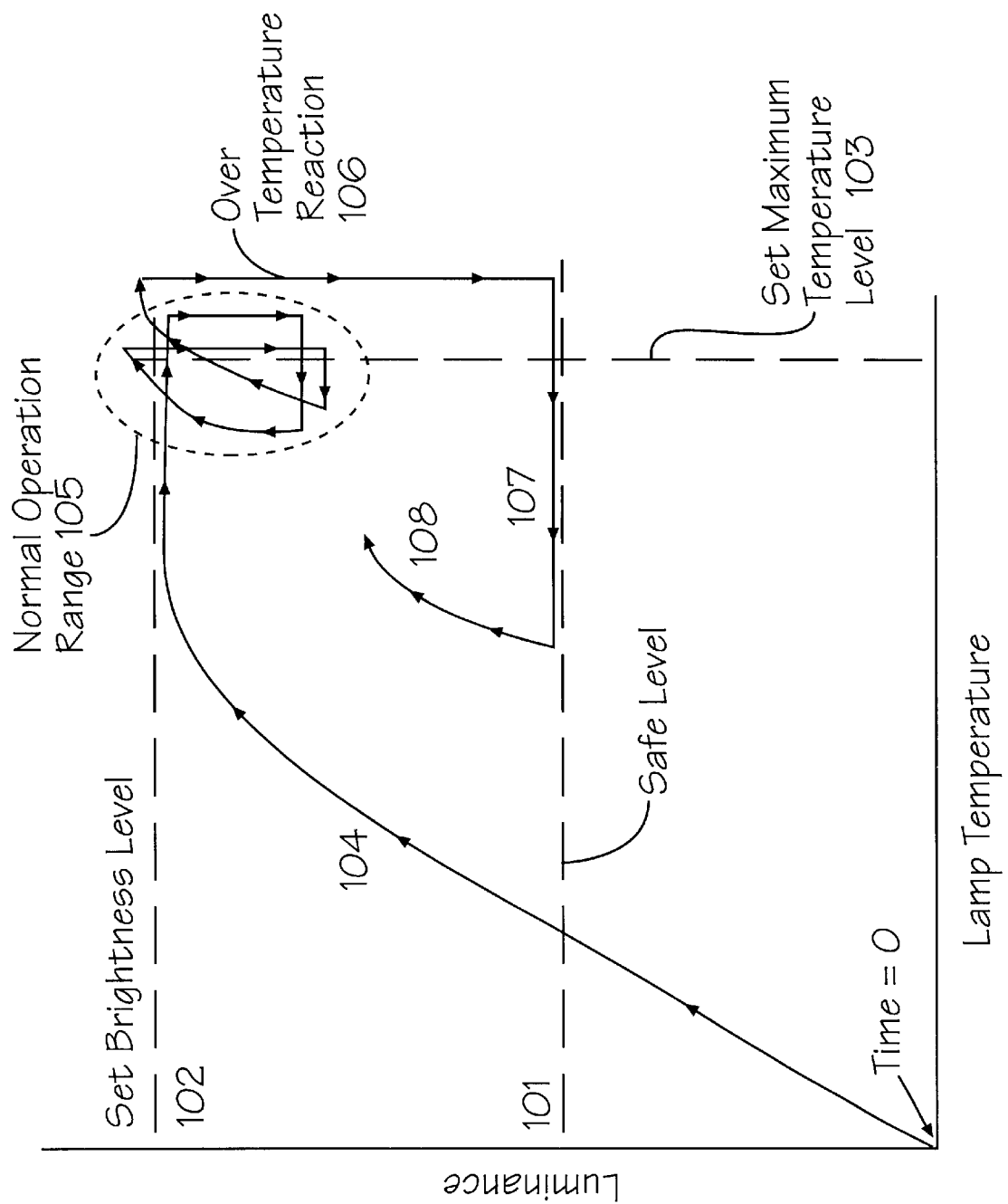
FIG. 10 graphically illustrates temperature control operation characteristics of the back light control of the present invention.

Referring now to FIG. 10, a normal operation of the back light 21 is shown along with a safe mode operation sequence of events. The normal operation of the back light module 21 is to initially turn it on. Fan speeds and dimming output data are set at predetermined initialization levels. As the unit heats up, lamp temperature follows curve 104 towards the preset brightness level 102 and upper operating temperature level 103.

As the temperature level 103 is reached, power is reduced incrementally in steps to the lamps 23 via the dimming output data. When temperature reaches an acceptable lower operating temperature, the fan speed is incrementally increased. This area of control on the curve is the normal operation area, depicted by reference numeral 105. In the event of an over temperature condition 106, the lamp power is reduced via the dimming output data level to a predetermined safe power (brightness) level 101. The lamp temperature then drops, following path 107. When the temperature is in a safe zone, the lamp power is again increased following curve 108 towards the normal operating area 105. If this over temperature condition reoccurs a predetermined number of times, a shut down will occur.

Since other control configurations can be formulated to fit particular operating requirements and environments, it will be apparent to those skilled in the art that the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A back light apparatus for use with a large-area, flat-panel display, comprising:
   a) a housing having a light output region;
   b) an array of fluorescent lamps disposed within said housing;
   c) at least one ballast operatively connected to said array of fluorescent lamps;
   d) reflecting means located within said housing and proximate said array of fluorescent lamps;
   e) temperature control means comprising:
      i) at least one cooling zone across the width of said array of fluorescent lamps, said cooling zone comprising at least one variable speed fan associated therewith;
      ii) temperature sensing means proximate at least one lamp of said array of fluorescent lamps and adapted to sense the temperature within said housing;
      iii) controller means operatively connected to said at least one variable speed fan and said temperature sensing means to vary the speed of said at least one variable speed fan for maintaining the temperature within said housing within a predetermined range of temperatures; and
   f) light diffusing means located between said array of fluorescent lamps and said light output region.

2. The back light apparatus for use with a large-area, flat-panel display as recited in claim 1, wherein said fluorescent lamps comprise tubular fluorescent lamps.

3. The back light apparatus for use with a large-area, flat-panel display as recited in claim 2, wherein said array of fluorescent lamps is mounted substantially horizontally in said housing.

4. The back light apparatus for use with a large-area, flat-panel display as recited in claim 3, wherein said temperature sensing means comprises a thermistor.

5. The back light apparatus for use with a large-area, flat-panel display as recited in claim 4, wherein said thermistor is mounted proximate a distal end of one of said tubular fluorescent lamps so as to leave light outputted by said one of said tubular fluorescent lamps visually unaffected.

6. The back light apparatus for use with a large-area, flat-panel display as recited in claim 4, further comprising a voltage divider network comprising at least two resistive elements, said thermistor being one of said at least two resistive elements.

7. The back light apparatus for use with a large-area, flat-panel display as recited in claim 3, further comprising:
   h) at least one optical component from the group of: diffusers, collimators, lens arrays and light-directing structures disposed between said array of fluorescent lamps and said light output region.

8. The back light apparatus for use with a large-area, flat-panel display as recited in claim 3, wherein said at least one variable speed fan comprises means for controlling the speed thereof responsive to an environmental condition.

9. The back light apparatus for use with a large-area, flat-panel display as recited in claim 8, wherein said environmental condition occurs within said housing.

10. The back light apparatus for use with a large-area, flat-panel display as recited in claim 9, wherein said environmental condition occurs within said at least one cooling zone.

11. The back light apparatus for use with a large-area, flat-panel display as recited in claim 10, wherein said temperature control means further comprises means for dimming at least one lamp of said array of fluorescent lamps, the temperature of each lamp of said array of lamps being substantially identical.

12. The back light apparatus for use with a large-area, flat-panel display as recited in claim 8, wherein said means for controlling the speed of said at least one fan comprises a micro-controller.

13. The back light apparatus for use with a large-area, flat-panel display as recited in claim 12, wherein said temperature sensing means is adapted to produce an output signal representative of a temperature in said at least one cooling zone and said output signal is digitized and provided to said micro-controller for controlling the speed of said at least one fan in response to said temperature.

14. The back light apparatus for use with a large-area, flat-panel display as recited in claim 13, wherein said at least one cooling zone comprises a plurality of cooling zones and said at least one variable speed fan comprises a plurality of variable speed fans, each of said plurality of variable speed fans being associated with at least one of said plurality of cooling zones and adapted in concert with others of said plurality of variable speed fans associated with their cooling zones and adapted to operate independently from any other of said plurality of variable speed fans.

15. The back light apparatus for use with a large-area, flat-panel display as recited in claim 14, wherein the speed of at least one of said plurality of variable-speed fans is controlled by a discrete fan speed control signal.

16. The back light apparatus for use with a large-area, flat-panel display as recited in claim 15, wherein said discrete fan speed control signals for all fans associated with said cooling zones are substantially identical.

17. The back light apparatus for use with a large-area, flat-panel display as recited in claim 16, wherein said micro-controller comprises a look-up table and discrete fan speed control signals are derived from data residing in said look-up table.

18. The back light apparatus for use with a large-area, flat-panel display as recited in claim 17, wherein said temperature sensing means provides an output signal representative of a sensed temperature and said discrete fan speed control signals for all of said cooling zones are derived from said output signal from said temperature sensing means.

19. The back light apparatus for use with a large-area, flat-panel display as recited in claim 17, wherein said discrete fan speed control signals for each of said cooling zones are derived from said output signal associated with said temperature sensing means.

20. The back light apparatus for use with a large-area, flat-panel display as recited in claim 15, wherein said discrete fan speed control signals are derived from data residing in a look-up table operatively connected to said micro-controller.

21. The back light apparatus for use with a large-area, flat-panel display as recited in claim 13, wherein said temperature sensing means, said micro-controller and said at least one fan act cooperatively to maintain said temperature in said at least one cooling zone within a predetermined range of temperatures.

22. The back light apparatus for use with a large-area, flat-panel display as recited in claim 21, wherein said micro-controller comprises a look-up table adapted to relate said output signal from said temperature sensing means to a discrete fan speed control signal.

23. The back light apparatus for use with a large-area, flat-panel display as recited in claim 12, wherein said temperature sensing means comprises plural thermistors.

24. The back light apparatus for use with a large-area, flat-panel display as recited in claim 12, wherein said at least one ballast comprises at least one dimming ballast operatively connected to said micro-controller whereby said micro-controller dims at least one of said array of fluorescent lamps in response to said environmental condition.

25. The back light apparatus for use with a large-area, flat-panel display as recited in claim 24, wherein said environmental condition comprises the temperature in said housing and said at least one lamp is dimmed until said temperature falls below a predetermined temperature.

26. The back light apparatus for use with a large-area, flat-panel display as recited in claim 25, wherein said dimming is performed in incremental steps.

27. The back light apparatus for use with a large-area, flat-panel display as recited in claim 24, further comprising means for monitoring the number of times the temperature in said housing exceeds a predetermined temperature and turning off said array of lamps when said number of times exceeds a predetermined value.

* * * * *